US012337971B2

(12) United States Patent
Ocana

(10) Patent No.: US 12,337,971 B2
(45) Date of Patent: Jun. 24, 2025

(54) TURBULENCE REDUCTION SEAT DEVICE

(71) Applicant: Katie Ocana, Casper, WY (US)

(72) Inventor: Katie Ocana, Casper, WY (US)

( * ) Notice: Subject to any disclaimer, the term of this patent is extended or adjusted under 35 U.S.C. 154(b) by 258 days.

(21) Appl. No.: 18/195,255

(22) Filed: May 9, 2023

(65) Prior Publication Data

US 2024/0375778 A1 Nov. 14, 2024

(51) Int. Cl.
*B64D 11/06* (2006.01)
*B64D 11/00* (2006.01)

(52) U.S. Cl.
CPC ...... *B64D 11/0619* (2014.12); *B64D 11/0015* (2013.01); *B64D 11/0606* (2014.12); *B64D 11/0697* (2014.12)

(58) Field of Classification Search
CPC ............ B64D 11/0619; B64D 11/0606; B64D 11/0697; B64D 11/0015
See application file for complete search history.

(56) References Cited

U.S. PATENT DOCUMENTS

D275,605 S 9/1984 Taylor
4,550,457 A 11/1985 Dukkers
4,582,354 A 4/1986 Halim
4,594,817 A 6/1986 McLaren
5,725,472 A 3/1998 Weathers
5,784,836 A 7/1998 Ehrick
2021/0107660 A1* 4/2021 Oshita ................ B64D 11/0641
2021/0347484 A1 11/2021 James
2024/0262514 A1* 8/2024 Nardin ................... B64D 17/78
2025/0019080 A1* 1/2025 Bey ........................ B64D 11/06

FOREIGN PATENT DOCUMENTS

CN 1327932 A * 12/2001
WO WO9614243 5/1996

* cited by examiner

*Primary Examiner* — Anthony D Barfield

(57) ABSTRACT

A turbulence reduction seat device includes an orb that is positioned within an aircraft and which has an entrance to facilitate a passenger to enter the orb. A chair is positioned within the orb to facilitate the passenger to sit on the chair when the passenger enters the orb. A door is slidably attached to the orb for opening and closing the entrance. A pair of shock absorbers is each movably attached to the orb. Each of the pair of shock absorbers is mounted to a respective one of a floor and a ceiling of the aircraft to reduce movement of the orb when the aircraft encounters turbulence. A plurality of display screens is each integrated into the outer wall of the orb and each of the display screens displays indicia to facilitate the passenger to view the indicia.

11 Claims, 7 Drawing Sheets

10 50 48 46 42 40 16 114 112 12 30 VIDEO SOURCE 34 24 50 40 44

TURBULENCE REDUCTION SEAT DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to seating devices and more particularly pertains to a new seating device for reducing the sensation of turbulence while flying in an aircraft. The device includes an orb that is mounted on a pair of shock absorbers to inhibiting vertical movement of the orb and a chair that is positioned within the orb to accommodate a passenger. The device includes a plurality of translucent display screens integrated into the orb for viewing in-flight entertainment and a tracking beacon for locating the orb in the event of a crash.

(2) Description of Related Art Including Information Disclosed Under 37 CFR 1.97 and 1.98

The prior art relates to seating devices including a variety of enclosures that are disposed in a vehicle for transporting a plurality of passengers that each has various elements for enhancing comfort for a passenger occupying the enclosures. In no instance does the prior art disclose an enclosure that is disposed within an aircraft for accommodating a passenger and which includes shock absorbers for inhibiting vertical movement of the enclosure as the result of in-flight turbulence.

BRIEF SUMMARY OF THE INVENTION

An embodiment of the disclosure meets the needs presented above by generally comprising an orb that is positioned within an aircraft and which has an entrance to facilitate a passenger to enter the orb. A chair is positioned within the orb to facilitate the passenger to sit on the chair when the passenger enters the orb. A door is slidably attached to the orb for opening and closing the entrance. A pair of shock absorbers is each movably attached to the orb. Each of the pair of shock absorbers is mounted to a respective one of a floor and a ceiling of the aircraft to reduce movement of the orb when the aircraft encounters turbulence. A plurality of display screens is each integrated into the outer wall of the orb and each of the display screens displays indicia to facilitate the passenger to view the indicia.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
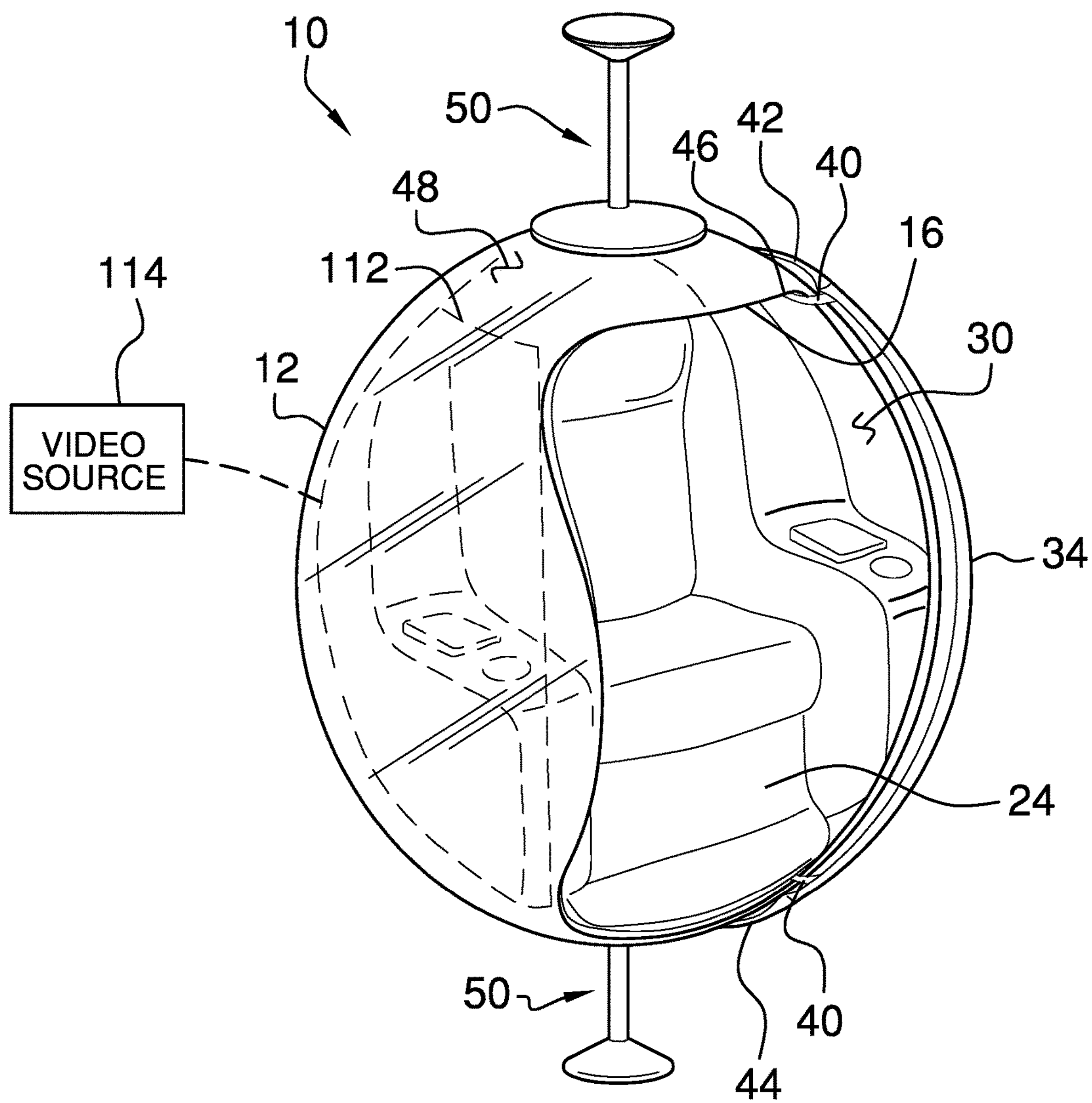
FIG. 1 is a front perspective view of a turbulence reduction seat device according to an embodiment of the disclosure.
Figure 2:
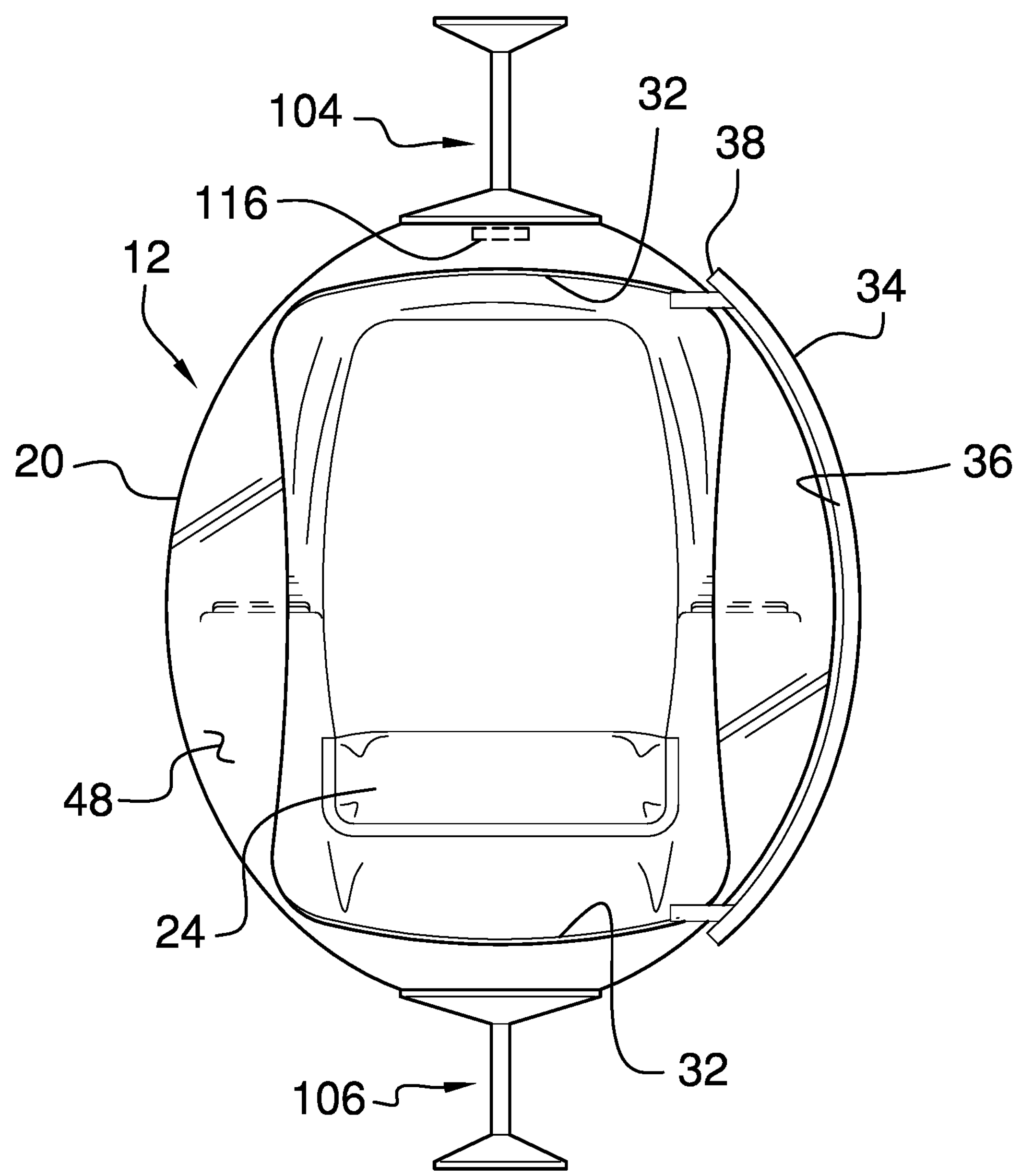
FIG. 2 is a front view of an embodiment of the disclosure.
Figure 3:
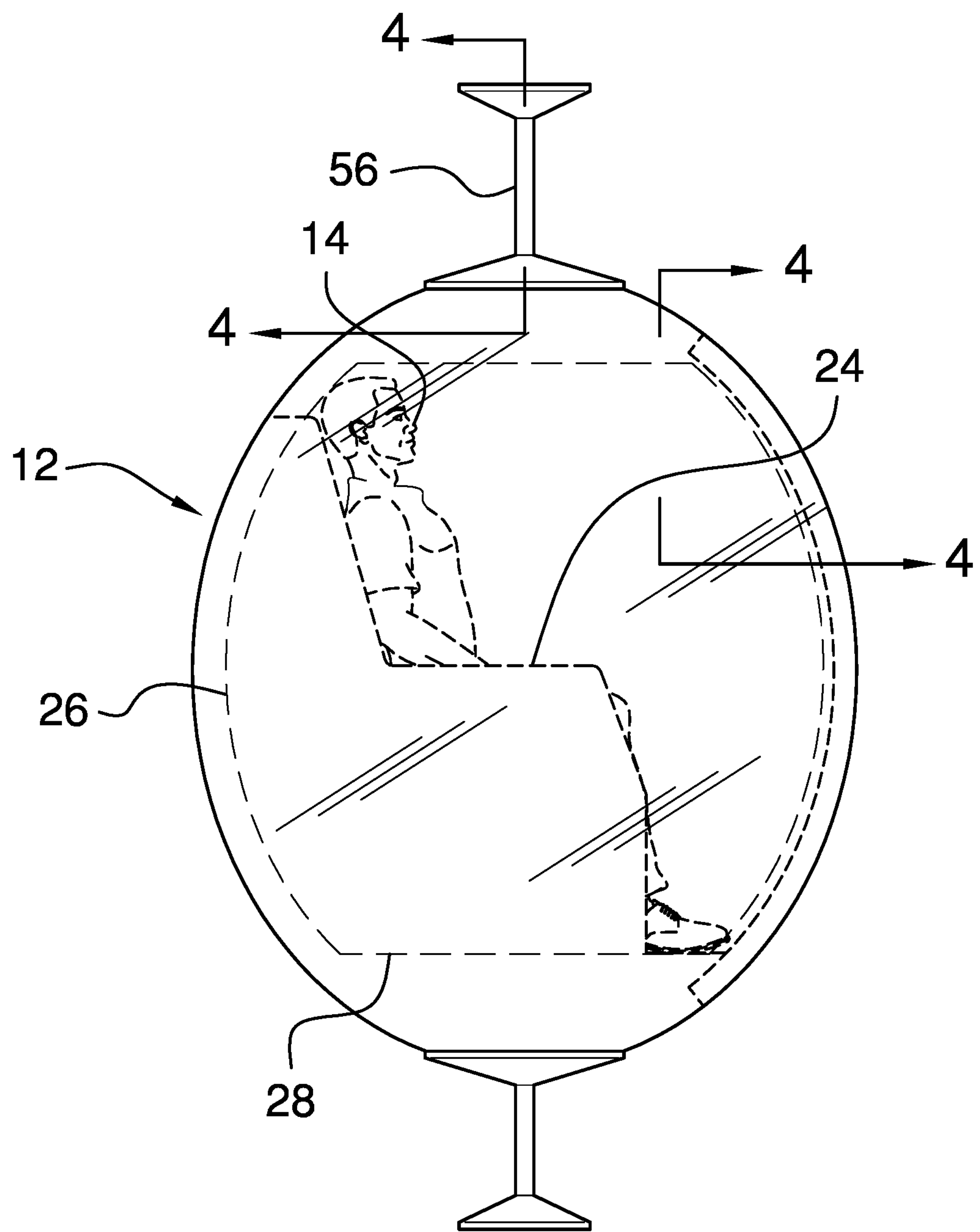
FIG. 3 is a right side phantom view of an embodiment of the disclosure.
Figure 4:
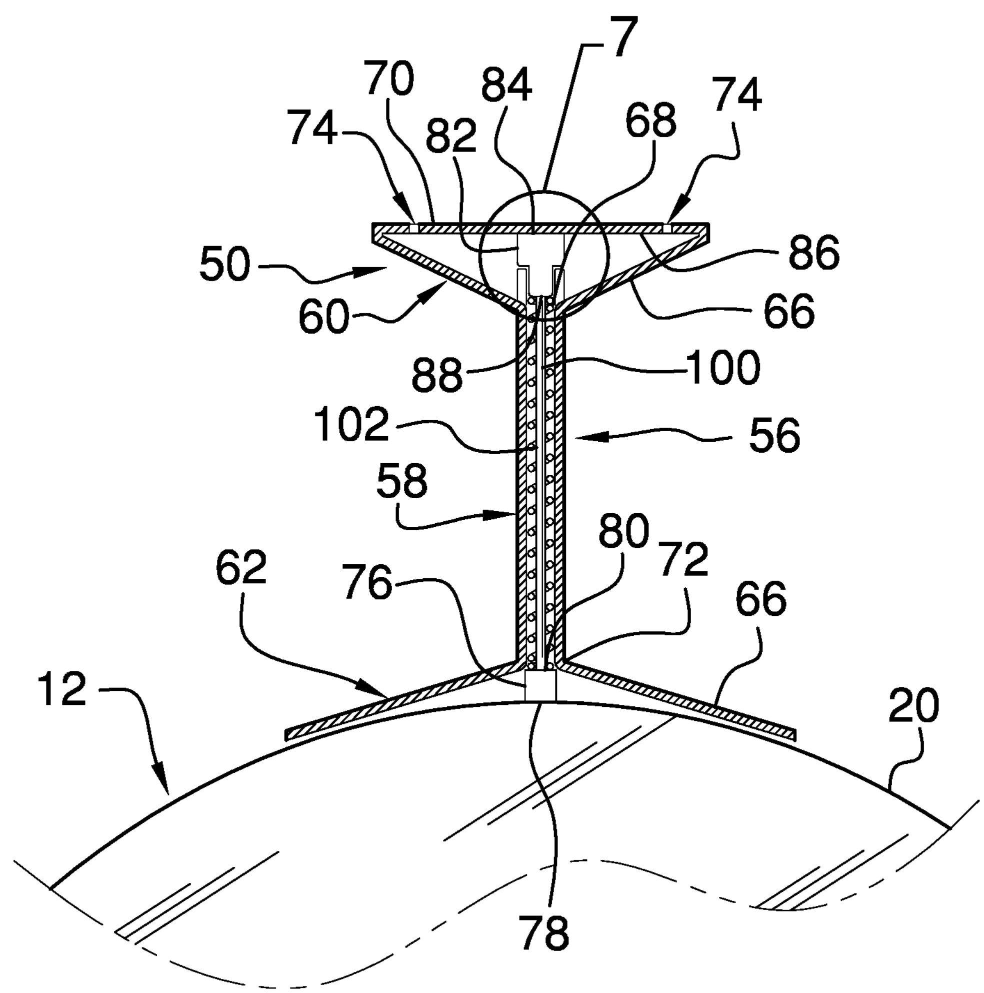
FIG. 4 is a cross sectional view taken along line 4-4 of FIG. 3 of an embodiment of the disclosure.
Figure 5:
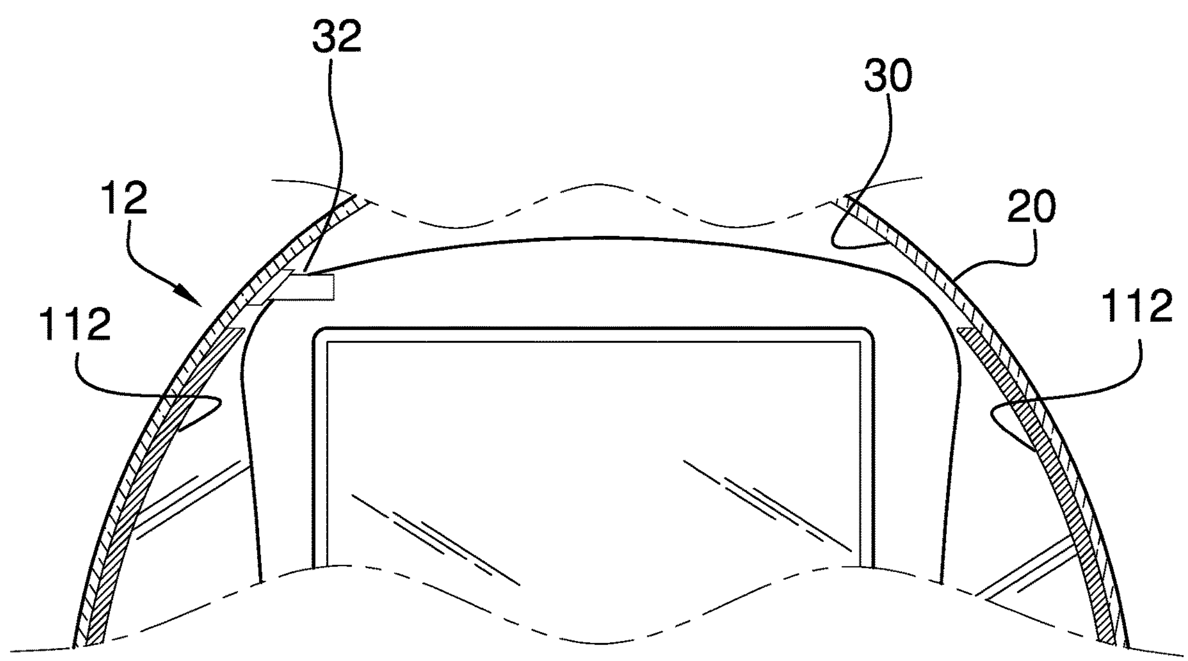
FIG. 5 is a cross sectional view taken along line 5-5 of FIG. 3 of an embodiment of the disclosure.
Figure 6:
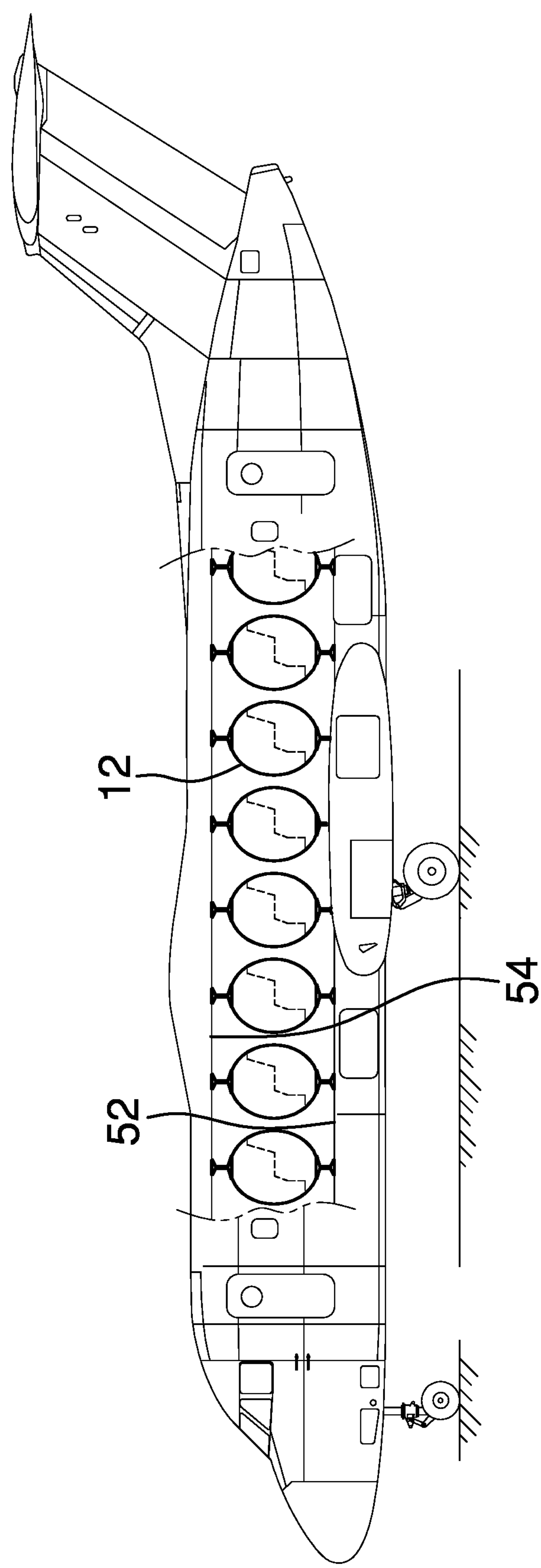
FIG. 6 is a cut-away in-use view of an embodiment of the disclosure.
Figure 7:
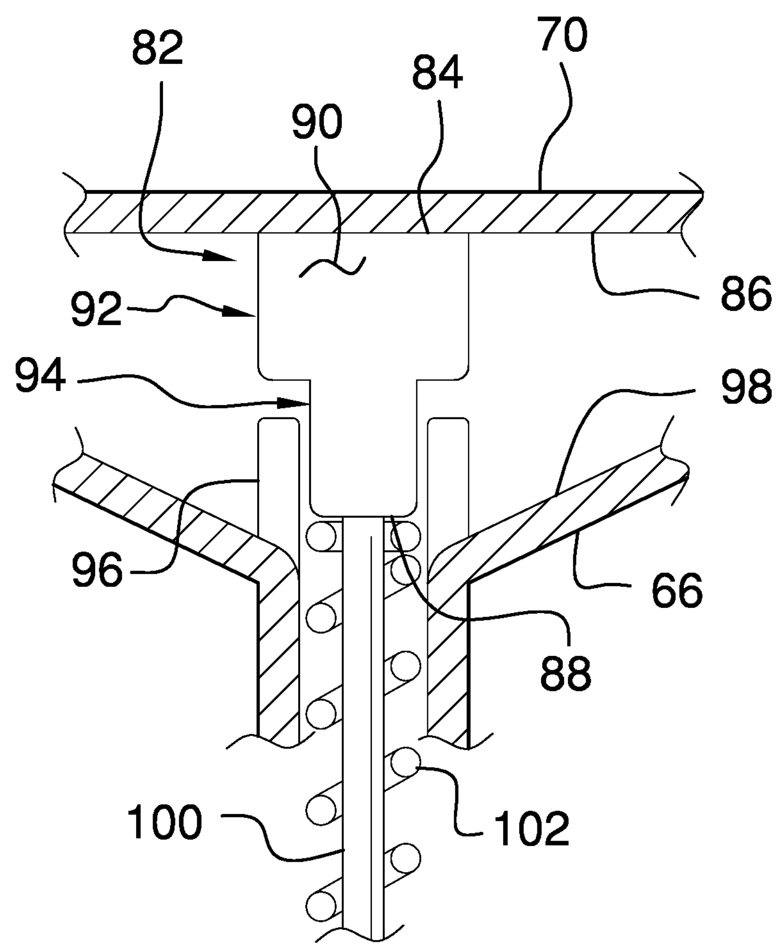
FIG. 7 is a magnified detail view taken from circle 7 of FIG. 4 of an embodiment of the disclosure.

With reference now to the drawings, and in particular to FIGS. 1 through 7 thereof, a new seating device embodying the principles and concepts of an embodiment of the disclosure and generally designated by the reference numeral 10 will be described.

As best illustrated in FIGS. 1 through 7, the turbulence reduction seat device 10 generally comprises an orb 12 that is positioned within an aircraft 14 and the orb 12 has an entrance 16 to facilitate a passenger 18 to enter the orb 12. The aircraft 14 may be a commercial airliner of any conventional design for transporting multiple passengers. The orb 12 is comprised of a translucent material to pass light through the orb 12 to facilitate the passenger 18 to see through the orb 12 when the passenger 18 is within the orb 12. Furthermore, the orb 12 is comprised of a heat resistant material to protect the passenger 18 from fire in the event that the aircraft 14 crashes. Additionally, the orb 12 is comprised of a buoyant material to float in the event the aircraft 14 crashes in water.

The orb 12 has an outer wall 20 that is continuously arcuate about a vertical axis such that the orb 12 has a spherical shape and the orb 12 is elongated along the vertical axis such that the orb 12 has an ovoid shape. Additionally, the orb 12 has an opening 22 extending through the outer wall 20 such that the opening 22 defines the entrance 16. A chair 24 is positioned within the orb 12 to facilitate the passenger 18 to sit on the chair 24 when the passenger 18 enters the orb 12. The chair 24 has a rear side 26 and a bottom side 28 that is each shaped to conform to curvature of an inside surface 30 of the outer wall 20 having the chair 24 facing the entrance 16. The chair 24 may be structured to comply with safety regulations determined by the Federal Aviation Administration.

A pair of tracks 32 is attached to the inside surface 30 of the outer wall 20 of the orb 12 and each of the tracks 32 is horizontally oriented in the orb 12. A respective one of the tracks 32 is positioned above the opening 22 in the outer wall 20 of the orb 12 and a respective one of the tracks 32 is positioned below the opening 22 in the outer wall 20 of the orb 12. A door 34 is slidably attached to the orb 12 and the door 34 is positionable in a closed position having the door 34 covering the entrance 16. The door 34 is positionable in an open position such that the entrance 16 is exposed. The door 34 has a rear surface 36 and a perimeter edge 38 and the rear surface 36 is concavely arcuate with respect to the perimeter edge 38 such that the door 34 conforms to curvature of the outer wall 20 of the orb 12.

A pair of arms 40 is each coupled to and extends away from the rear surface 36 of the door 34. Each of the arms 40 is positioned adjacent to a respective one of a top side 42 and a bottom side 44 of the perimeter edge 38 of the door 34 and each of the arms 40 is curved between the rear surface 36 of the door 34 and a distal end 46 of the arms 40. Additionally, the distal end 46 of each of the arms 40 slidably engages a respective one of the tracks 32 thereby facilitating the door 34 to be positioned between the open position and the closed position. The rear surface 36 of the door 34 is spaced from an outside surface 48 of the outer wall 20 of the orb 12 having the door 34 being laterally displaced from the opening 22 in the outer wall 20 of the orb 12 when the door 34 is in the open position.

A pair of shock absorbers 50 is provided and each of the pair of shock absorbers 50 is movably attached to the orb 12. Each of the pair of shock absorbers 50 is mounted to a respective one of a floor 52 and a ceiling 54 of the aircraft 14 thereby facilitating each of the pair of shock absorbers 50 to reduce movement of the orb 12 when the aircraft 14 encounters turbulence. In this way the pair of shock absorbers 50 enhances comfort for the passenger 18 sitting in the chair 24. Each of the shock absorbers 50 comprises a mount 56 that has a tube portion 58 extending between an upper foot portion 60 and a lower foot portion 62. The upper foot portion 60 has a lower wall 66 angling upwardly between an upper end 68 of the tube portion 58 and an upper wall 70 of the upper foot portion 60. The lower wall 66 the lower foot portion 62 angles downwardly from a lower end 72 of the tube portion 58. The upper wall 70 of the upper foot portion 60 has a plurality of holes 74 extending through the upper wall 70 for accommodating fasteners for attaching the upper wall 70 to a support surface.

Each of the shock absorbers 50 includes a first stop 76 that has a lower end 78 which is attached to the outer wall 20 of the orb 12 and an upper end 80 of the first stop 76 is aligned with the lower end 78 of the tube portion 58. Each of the shock absorbers 50 includes a second stop 82 that has a top end 84 which is attached to a lower surface 86 of the upper wall 70 of the upper foot portion 60 such that a bottom end 88 of the second stop 82 is aligned with the upper end 68 of the tube portion 58. The second stop 82 has an exterior surface 90 extending between the top end 84 and the bottom end 88 of the second stop 82 and the exterior surface 90 has an upper portion 92 which has a diameter that is greater than a diameter of a lower portion 94 of the exterior surface 90. The top end 84 of the second stop 82 is associated with the upper portion 92 of the exterior surface 90 and the bottom end 88 of the second stop 82 is associated with the lower portion 94 of the exterior surface 90.

Each of the shock absorbers 50 includes a collar 96 that is attached to a top surface 98 of the lower wall 66 of the upper foot portion 60 such that the lower portion 94 of the exterior surface 90 of the second stop 82 extends into the collar 89. Each of the shock absorbers 50 includes a shaft 100 that is coupled between the upper end 68 of the first stop 76 and the shaft 100 slidably extends into the bottom end 88 of the second stop 82 thereby facilitating the second stop 82 to slide upwardly and downwardly along the shaft 100. Each of the shock absorbers 50 includes a biasing member 102 that extends around the shaft 100. The biasing member 102 extends between the first stop 76 and the second stop 82 such that the second stop 82 is biased away from the first stop 76 thereby facilitating the lower foot portion 62 to be spaced from the outer wall 20 of the orb 12.

The pair of shock absorbers 50 includes a top shock absorber 104 and a bottom shock absorber 106. The upper wall 70 of the upper foot portion 60 associated with the top shock absorber 104 is attached to the ceiling 54 of the aircraft 14 and the lower foot portion 62 of associated with the top shock absorber 104 is aligned with an upper apex 108 of the outer wall 20 of the orb 12. The upper wall 70 of the upper foot portion 60 associated with the bottom shock absorber 106 is attached to the floor 52 of the aircraft 14 and the lower foot portion 62 of associated with the top shock absorber 104 is aligned with a lower apex 110 of the outer wall 20 of the orb 12. The top shock absorber 104 inhibits upward motion of the orb 12 and the bottom shock absorber 106 inhibits downward motion of the orb 12. Furthermore, the biasing member 102 associated with each of the shock absorbers 50 has a compressive strength of approximately 180.0 kg thereby facilitating the biasing member 102 to support the weight of the orb 12, the chair 24 and the passenger 18.

A plurality of display screens 112 is each integrated into the outer wall 20 of the orb 12 such that each of the plurality of display screens 112 is visible to the passenger 18. Each of the display screens 112 is comprised of a translucent material to facilitate the passenger 18 to see through the plurality of display screens 112 when the plurality of display screens 112 is turned off. Additionally, each of the plurality of display screens 112 is electrically coupled to a video source 114 in the aircraft 14 thereby facilitating each of the plurality of display screens 112 to display indicia to facilitate the passenger 18 to view the indicia. A respective one of the display screens 112 is integrated into the door 34 and respective ones of the plurality of display screens 112 is integrated into an outer wall 20 of the orb 12 having the respective plurality of display screens 112 being positioned on opposite sides of the chair 24 from each other. Each of the plurality of display screens 112 may comprise a translucent liquid crystal display or other type of translucent electronic display.

A tracking beacon 116 is provided and the tracking beacon 116 is integrated into the orb 12. The tracking beacon 116 is activated to broadcast a tracking signal in the event that the aircraft 14 crashes thereby facilitating the orb 12 to be located by emergency responders. The tracking beacon 116 may comprise a personal locating beacon which has an operational frequency of 406 MHz which complies with United States Coast Guard regulations for emergency beacons. As is most clearly shown in FIG. 6, a plurality of the orbs 12 may be provided which are evenly distributed throughout a passenger 18 area of the aircraft 14 to facilitate a plurality of passengers 18 to travel in the aircraft 14.

In use, the passenger 18 enters the orb 12 and the passenger 18 urges the door 34 into the closed position subsequent to being seated in the chair 24. Each of the pair of shock absorbers 50 inhibits upward and downward movement of orb 12 when the aircraft 14 encounters in-flight turbulence. In this way the passenger 18 can enjoy reduces degrees of anxiety that can commonly result from turbulence while flying. Furthermore, the plurality of display screens 112 facilitate the passenger 18 to enjoy watching movies, for example, or other forms of in-flight entertainment commonly employed in commercial airline travel. The orb 12 protects the passenger 18 from fire that could result from a crash as well as floating in water in the event that the aircraft 14 crashes in water to enhance to overall safety of the passenger 18 during aircraft 14 travel. Furthermore, the tracking beacon 116 is actuated in the event of a crash to facilitate the orb 12 to be located by emergency responders.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A turbulence reduction seat device being positioned within an aircraft for seating a passenger in the aircraft, said assembly comprising:

an orb being positioned within an aircraft, said orb having an entrance wherein said orb is configured to facilitate a passenger to enter said orb, said orb being comprised of a translucent material wherein said orb is configured to pass light through said orb to facilitate the passenger to see through said orb when the passenger is within said orb, said orb being comprised of a heat resistant material wherein said orb is configured to protect the passenger from fire in the event that said aircraft crashes, said orb being comprised of a buoyant material wherein said orb is configured to float in the event said aircraft crashes in water;

a chair being positioned within said orb wherein said chair is configured to facilitate the passenger to sit on said chair when the passenger enters said orb;

a door being slidably attached to said orb, said door being positionable in a closed position having said door covering said entrance, said door being positionable in an open position such that said entrance is exposed;

a pair of shock absorbers, each of said pair of shock absorbers being movably attached to said orb, each of said pair of shock absorbers being mounted to a respective one of a floor and a ceiling of said aircraft thereby facilitating each of said pair of shock absorbers to reduce movement of said orb when said aircraft encounters turbulence wherein said pair of shock absorbers is configured to enhance comfort for the passenger sitting in said chair; and a plurality of display screens, each of said display screens being integrated into said outer wall of said orb, each of the display screens display indicia wherein each of said plurality of display screens is configured to facilitate the indicia to be visible to the passenger, each of said display screens being comprised of a translucent material wherein each of said plurality of display screens is configured to facilitate the passenger to see through said plurality of display screens when said plurality of display screens is turned off.

2. The assembly according to claim 1, wherein:

said orb has an outer wall being continuously arcuate about a vertical axis such that said orb has a spherical shape, said orb being elongated along said vertical axis such that said orb has an ovoid shape, said orb having an opening extending through said outer wall such that said opening defines said entrance; and said chair has a rear side and a bottom side each being shaped to conform to curvature of an inside surface of said outer wall having said chair facing said entrance.

3. The assembly according to claim 1, wherein:

said orb has an outer wall being continuously arcuate about a vertical axis such that said orb has a spherical shape, said orb being elongated along said vertical axis such that said orb has an ovoid shape, said orb having an opening extending through said outer wall such that said opening defines said entrance; and said assembly includes a pair of tracks, each of said tracks being attached to said inside surface of said outer wall of said orb, each of said tracks being horizontally oriented in said orb, a respective one of said tracks being positioned above said opening in said outer wall of said orb, a respective one of said tracks being positioned below said opening in said outer wall of said orb.

4. The assembly according to claim 3, wherein:

said door has a rear surface and a perimeter edge, said rear surface being concavely arcuate with respect to said perimeter edge such that said door conforms to curvature of said outer wall of said orb; and said assembly includes a pair of arms, each of said arms being coupled to and extending away from said rear surface of said door, each of said arms being positioned adjacent to a respective one of a top side and a bottom side of said perimeter edge of said door, each of said arms being curved between said rear surface of said door and a distal end of said arms, said distal end of each of said arms slidably engaging a respective one of said tracks thereby facilitating said door to be positioned between said open position and said closed position, said rear surface of said door being spaced from an outside surface of said outer wall of said orb having said door being laterally displaced from said opening in said outer wall of said orb when said door is in said open position.

5. The assembly according to claim 1, wherein each of said pair of shock absorbers comprises a mount having a tube portion extending between an upper foot portion and a lower foot portion, said upper foot portion having a lower wall angling upwardly between an upper end of said tube portion and an upper wall of said upper foot portion, said lower wall said lower foot portion angling downwardly from a lower end of said tube portion, said upper wall of said upper foot portion having a plurality of holes extending through said upper wall for accommodating fasteners for attaching said upper wall to a support surface.

6. The assembly according to claim 5, wherein each of said pair of shock absorbers includes:

a first stop having a lower end being attached to said outer wall of said orb, an upper end of said first stop being aligned with said lower end of said tube portion;

a second stop having a top end being attached to a lower surface of said upper wall of said upper foot portion such that a bottom end of said second stop is aligned with said upper end of said tube portion, said second stop having an exterior surface extending between said top end and said bottom end of said second stop, said exterior surface having an upper portion having a diameter being greater than a diameter of a lower portion of said exterior surface, said top end of said second stop being associated with said upper portion of said exterior surface, said bottom end being associated with said lower portion of said exterior surface; and a collar being attached to a top surface of said lower wall of said upper foot portion such that said lower portion of said exterior surface of said second stop extends into said collar.

7. The assembly according to claim 6, wherein each of said pair of shock absorbers includes:

a shaft being coupled between said upper end of said first stop, said shaft slidably extending into a bottom end of said second stop thereby facilitating said second stop to slide upwardly and downwardly along said shaft; and a biasing member extending around said shaft, said biasing member extending between said first stop and said second stop such that said second stop is biased away from said first stop thereby facilitating said lower foot portion to be spaced from said outer wall of said orb.

8. The assembly according to claim 5, wherein:

said pair of shock absorbers includes a top shock absorber and a bottom shock absorber;

said upper wall of said upper foot portion associated with said top shock absorber is attached to said ceiling of said aircraft having said lower foot portion of associated with said top shock absorber being aligned with an upper apex of said outer wall of said orb;

said upper wall of said upper foot portion associated with said bottom shock absorber is attached to said floor of said aircraft having said lower foot portion of associated with said top shock absorber being aligned with a lower apex of said outer wall of said orb;

said top shock absorber inhibits upward motion of said orb; and said bottom shock absorber inhibits downward motion of said orb.

9. The assembly according to claim 1, wherein:

each of said plurality of display screens is electrically coupled to a video source in said aircraft thereby facilitating each of said plurality of display screens to display indicia wherein said plurality of display screens is configured to facilitate the passenger to view said indicia;

a respective one of said display screens is integrated into said door; and respective ones of said plurality of display screens is integrated into an outer wall of said orb having said respective plurality of display screens being positioned on opposite sides of said chair from each other.

10. The assembly according to claim 1, further comprising a tracking beacon being integrated into said orb, said tracking beacon being activated to broadcast a tracking signal in the event that said aircraft crashes thereby facilitating said orb to be located by emergency responders.

11. A turbulence reduction seat device being positioned within an aircraft for seating a passenger in the aircraft, said assembly comprising:

an orb being positioned within an aircraft, said orb having an entrance wherein said orb is configured to facilitate a passenger to enter said orb, said orb being comprised of a translucent material wherein said orb is configured to pass light through said orb to facilitate the passenger to see through said orb when the passenger is within said orb, said orb being comprised of a heat resistant material wherein said orb is configured to protect the passenger from fire in the event that said aircraft crashes, said orb being comprised of a buoyant material wherein said orb is configured to float in the event said aircraft crashes in water, said orb having an outer wall being continuously arcuate about a vertical axis such that said orb has a spherical shape, said orb being elongated along said vertical axis such that said orb has an ovoid shape, said orb having an opening extending through said outer wall such that said opening defines said entrance;

a chair being positioned within said orb wherein said chair is configured to facilitate the passenger to sit on said chair when the passenger enters said orb, said chair having a rear side and a bottom side each being shaped to conform to curvature of an inside surface of said outer wall having said chair facing said entrance;

a pair of tracks, each of said tracks being attached to said inside surface of said outer wall of said orb, each of said tracks being horizontally oriented in said orb, a respective one of said tracks being positioned above said opening in said outer wall of said orb, a respective one of said tracks being positioned below said opening in said outer wall of said orb;

a door being slidably attached to said orb, said door being positionable in a closed position having said door covering said entrance, said door being positionable in an open position such that said entrance is exposed, said door having a rear surface and a perimeter edge, said rear surface being concavely arcuate with respect to said perimeter edge such that said door conforms to curvature of said outer wall of said orb;

a pair of arms, each of said arms being coupled to and extending away from said rear surface of said door, each of said arms being positioned adjacent to a respective one of a top side and a bottom side of said perimeter edge of said door, each of said arms being curved between said rear surface of said door and a distal end of said arms, said distal end of each of said arms slidably engaging a respective one of said tracks thereby facilitating said door to be positioned between said open position and said closed position, said rear surface of said door being spaced from an outside surface of said outer wall of said orb having said door being laterally displaced from said opening in said outer wall of said orb when said door is in said open position;

a pair of shock absorbers, each of said pair of shock absorbers being movably attached to said orb, each of said pair of shock absorbers being mounted to a respective one of a floor and a ceiling of said aircraft thereby facilitating each of said pair of shock absorbers to reduce movement of said orb when said aircraft encounters turbulence wherein said pair of shock absorbers is configured to enhance comfort for the passenger sitting in said chair, each of said shock absorbers comprising:

a mount having a tube portion extending between an upper foot portion and a lower foot portion, said upper foot portion having a lower wall angling upwardly between an upper end of said tube portion and an upper wall of said upper foot portion, said lower wall said lower foot portion angling downwardly from a lower end of said tube portion, said upper wall of said upper foot portion having a plurality of holes extending through said upper wall for accommodating fasteners for attaching said upper wall to a support surface;

a first stop having a lower end being attached to said outer wall of said orb, an upper end of said first stop being aligned with said lower end of said tube portion;

a second stop having a top end being attached to a lower surface of said upper wall of said upper foot portion such that a bottom end of said second stop is aligned with said upper end of said tube portion, said second stop having an exterior surface extending between said top end and said bottom end of said second stop, said exterior surface having an upper portion having a diameter being greater than a diameter of a lower portion of said exterior surface, said top end of said second stop being associated with said upper portion of said exterior surface, said bottom end being associated with said lower portion of said exterior surface;

a collar being attached to a top surface of said lower wall of said upper foot portion such that said lower portion of said exterior surface of said second stop extends into said collar;

a shaft being coupled between said upper end of said first stop, said shaft slidably extending into a bottom end of said second stop thereby facilitating said second stop to slide upwardly and downwardly along said shaft; and a biasing member extending around said shaft, said biasing member extending between said first stop and said second stop such that said second stop is biased away from said first stop thereby facilitating said lower foot portion to be spaced from said outer wall of said orb;

wherein said pair of shock absorbers includes a top shock absorber and a bottom shock absorber, said upper wall of said upper foot portion associated with said top shock absorber being attached to said ceiling of said aircraft having said lower foot portion of associated with said top shock absorber being aligned with an upper apex of said outer wall of said orb, said upper wall of said upper foot portion associated with said bottom shock absorber being attached to said floor of said aircraft having said lower foot portion of associated with said top shock absorber being aligned with a lower apex of said outer wall of said orb, said top shock absorber inhibiting upward motion of said orb, said bottom shock absorber inhibiting downward motion of said orb;

a plurality of display screens, each of said display screens being integrated into said outer wall of said orb wherein each of said plurality of display screens is configured to be visible to the passenger, each of said display screens being comprised of a translucent material wherein each of said plurality of display screens is configured to facilitate the passenger to see through said plurality of display screens when said plurality of display screens is turned off, each of said plurality of display screens is electrically coupled to a video source in said aircraft thereby facilitating each of said plurality of display screens to display indicia wherein said plurality of display screens is configured to facilitate the passenger to view said indicia, a respective one of said display screens being integrated into said door, respective ones of said plurality of display screens being integrated into an outer wall of said orb having said respective plurality of display screens being positioned on opposite sides of said chair from each other; and a tracking beacon being integrated into said orb, said tracking beacon being activated to broadcast a tracking signal in the event that said aircraft crashes thereby facilitating said orb to be located by emergency responders.

* * * * *